United States Patent [19]
Miller, III et al.

[11] Patent Number: 5,547,143
[45] Date of Patent: Aug. 20, 1996

[54] SEAT BELT RETRACTOR WITH INTEGRATED LOAD LIMITER

[75] Inventors: Harold J. Miller, III, Troy; Niels Dybro, Utica, both of Mich.

[73] Assignee: AlliedSignal Inc., Morristown, N.J.

[21] Appl. No.: 296,045

[22] Filed: Aug. 24, 1994

[51] Int. Cl.$^6$ .................................................. B60R 22/28
[52] U.S. Cl. .................................................. 242/379.100
[58] Field of Search ........................... 242/379.1, 376, 242/376.1; 280/805; 297/470–472

[56] References Cited

U.S. PATENT DOCUMENTS 3,790,099  2/1974  Beller .................................. 242/379.1
3,881,667  5/1975  Tandetzke ....................... 242/379.1 X
3,927,846  12/1975  Meissner ............................. 242/379.1
3,952,967  4/1976  Barile et al. ........................ 242/379.1
3,961,761  6/1976  Wiesbock ........................... 242/379.1
4,322,046  3/1982  Tanaka et al. .

FOREIGN PATENT DOCUMENTS 2452941  10/1980  France .

Primary Examiner—John M. Jillions
Attorney, Agent, or Firm—Markell Seitzman

[57] ABSTRACT

A load absorbing retractor comprising: a rotating spool or reel, seat belt webbing secured to the reel; at least one movable bushing, responsive to loads generated during an emergency situation, for deforming a portion of the reel and in so doing dissipating a determinable amount of the energy.

4 Claims, 4 Drawing Sheets

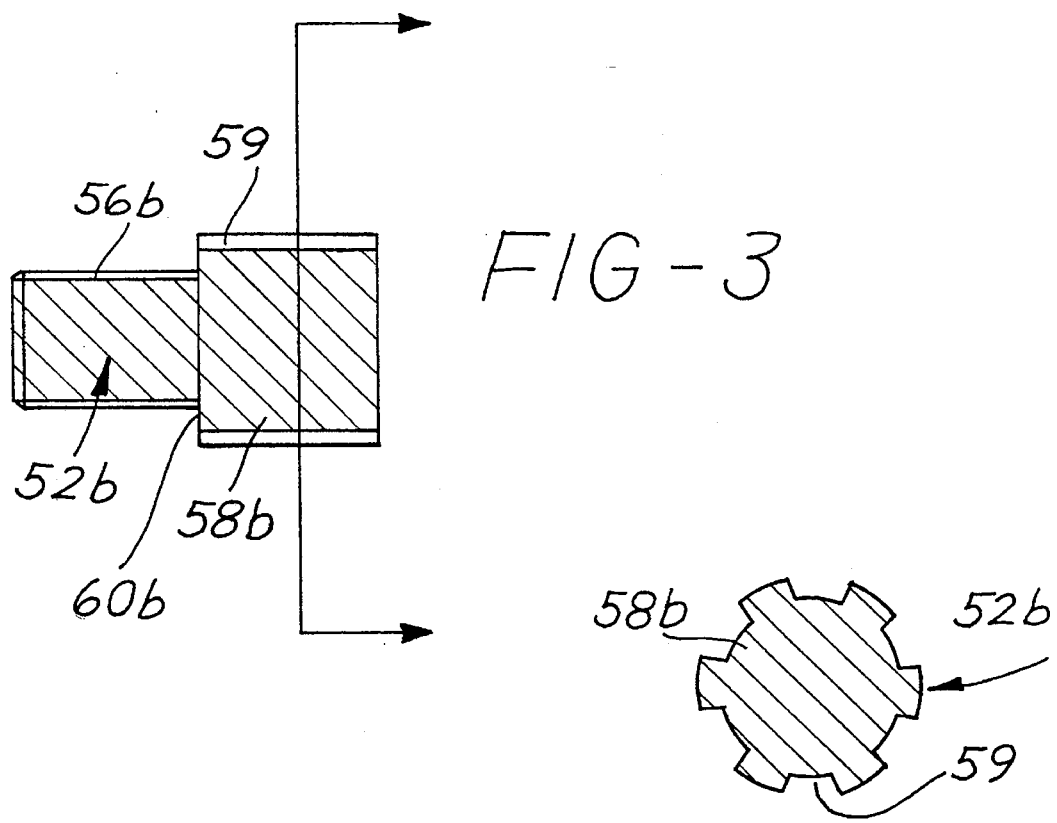
FIG-3
FIG-4
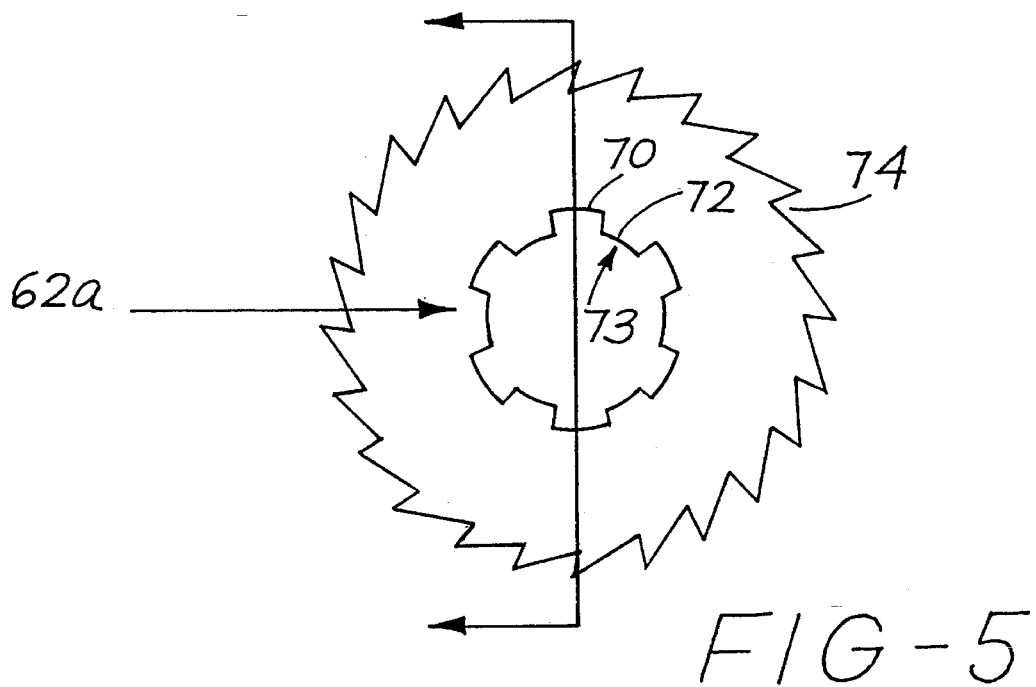
FIG-5

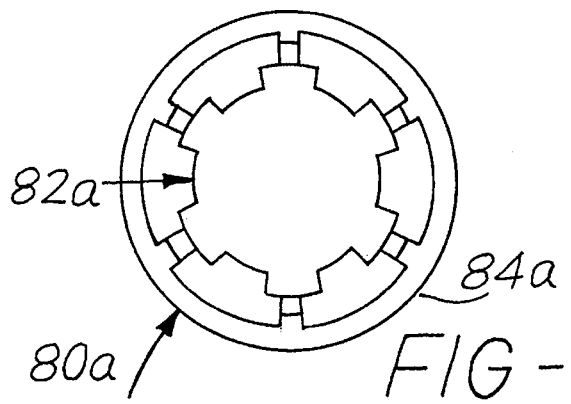
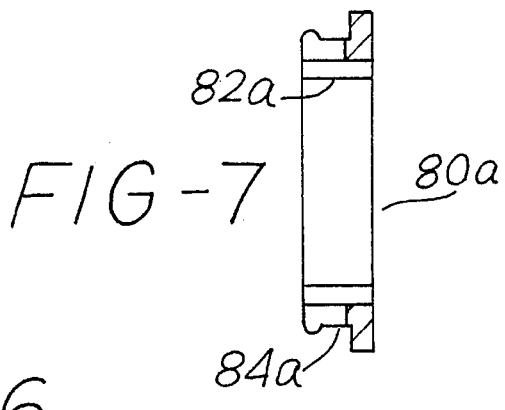
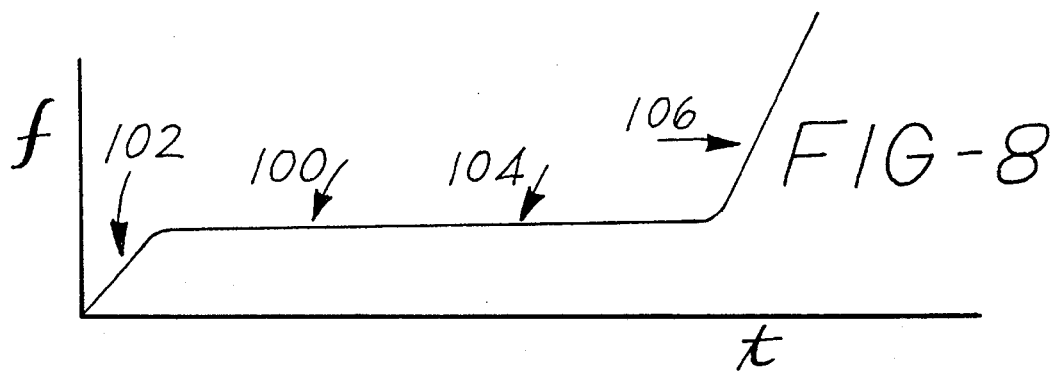
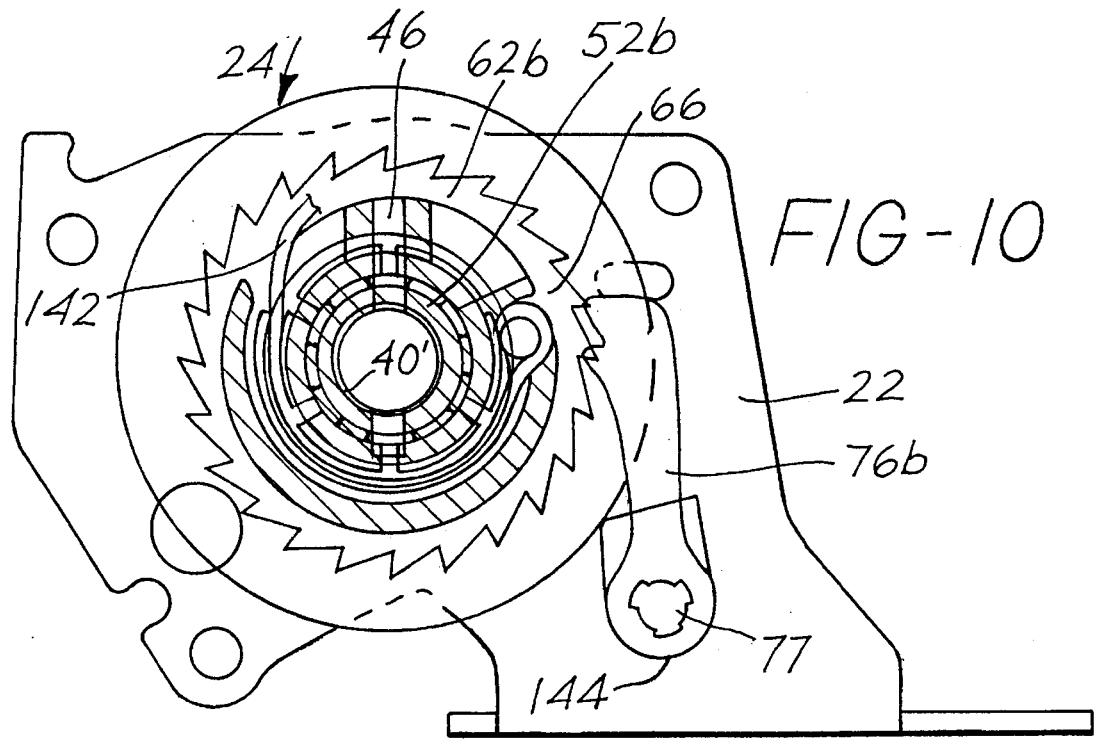

5,547,143

SEAT BELT RETRACTOR WITH INTEGRATED LOAD LIMITER

BACKGROUND AND SUMMARY OF THE INVENTION

The present invention relates to vehicle restraints generally and to a seat belt retractor having means for absorbing a certain amount of energy during a crash by deforming and/or crushing internal parts and therefor limiting the energy imparted to an occupant to lower the potential for injury.

Safety belt restraint system (or sub-systems) and air bag systems (or sub-systems) are often designed to meet separate and distinct safety criteria and performance standards and then these separately designed systems are used together as a combined system to provide occupant protection during vehicle crashes and accidents. The performance of these systems, in terms of known, measurable occupant injury performance standards such as head injury criteria (HIC) and resultant chest acceleration may not necessarily be equal to or less than the performance of either individual subsystem. It is believed that the degradation in performance, as manifested by increased occupant chest acceleration and related chest loading, is the result of an effective increased stiffness afforded by the seat belt system working in concert with the air bag system. These injury criteria and the potential for actual injury can be reduced by introducing into the seat belt safety system an energy absorbing device which absorbs a certain amount of the energy produced in a crash or other emergency driving condition and in so doing lessens the amount of energy that could be absorbed by the occupant thereby lessening the potential for occupant injury.

It is an object of the present invention to provide an improved occupant protection system and more specifically an energy absorbing retractor. The invention herein describes a method and apparatus for improving occupant performance by reducing the potential for injuries. The present invention comprises: a load absorbing retractor comprising: a rotating spool or reel, seat belt webbing secured to the reel; first means, responsive to loads generated during an emergency situation, for deforming a portion of the reel and in so doing dissipating a determinable amount of the energy and hence limiting the loads transmitted to an occupant.

Many other objects and purposes of the invention will be clear from the following detailed description of the drawings.

BRIEF DESCRIPTION OF THE DRAWINGS

In the drawings:

FIGS. 3 and 4 show a side view and an end view of an axle part.

FIG. 5 is a plan view of a lock wheel.

FIGS. 6 and 7 show an optional bushing.

FIG. 8 shows a force-time curve.

DETAILED DESCRIPTION OF THE DRAWINGS

Figure 1:
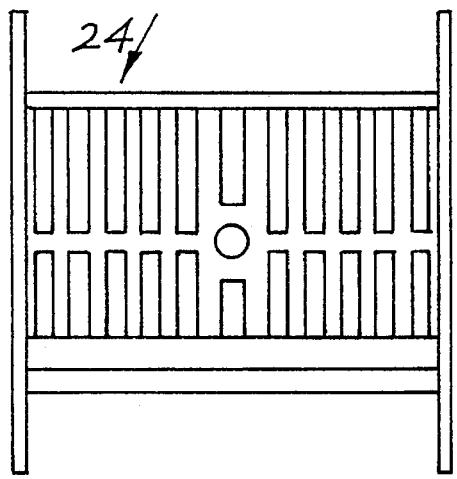
FIG. 1 is a plan view of a reel.
Figure 2:
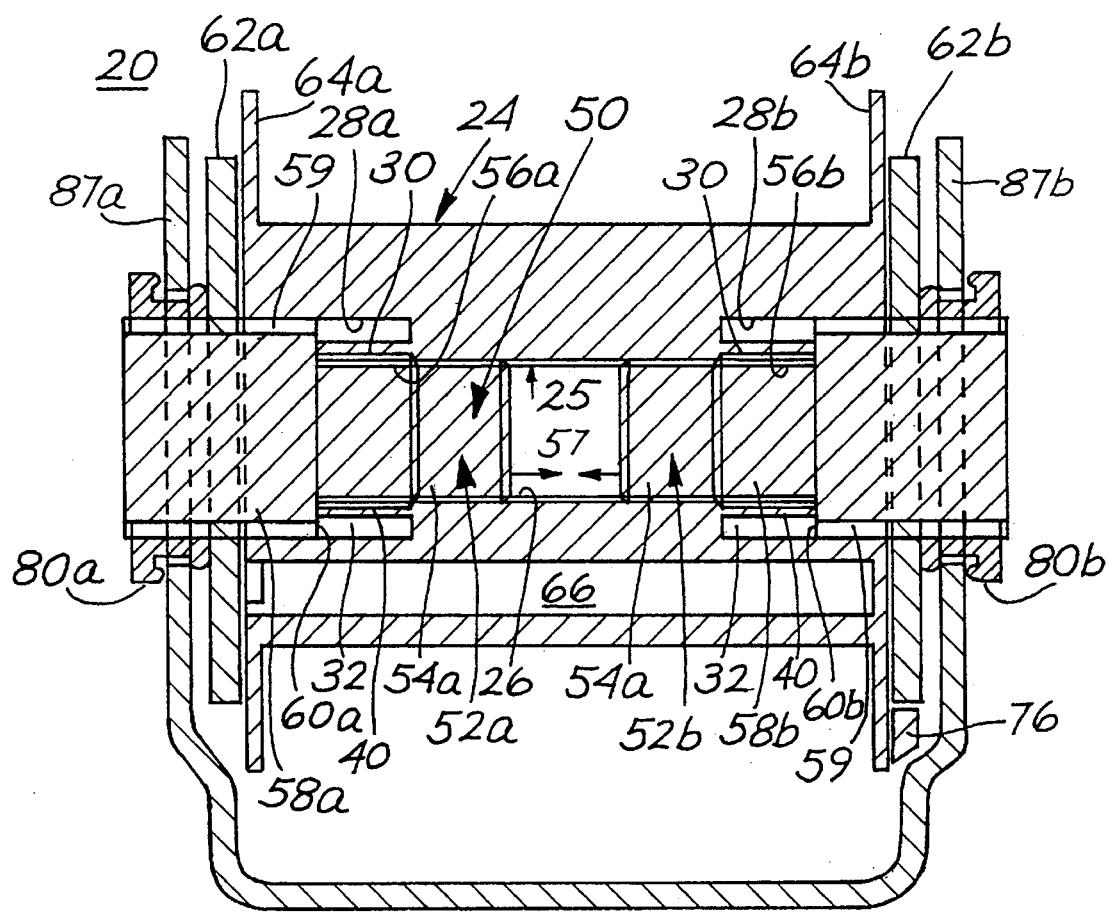
FIG. 2 shows a cross-sectional view of the spool and also shows other major parts of the invention.
Figure 9:
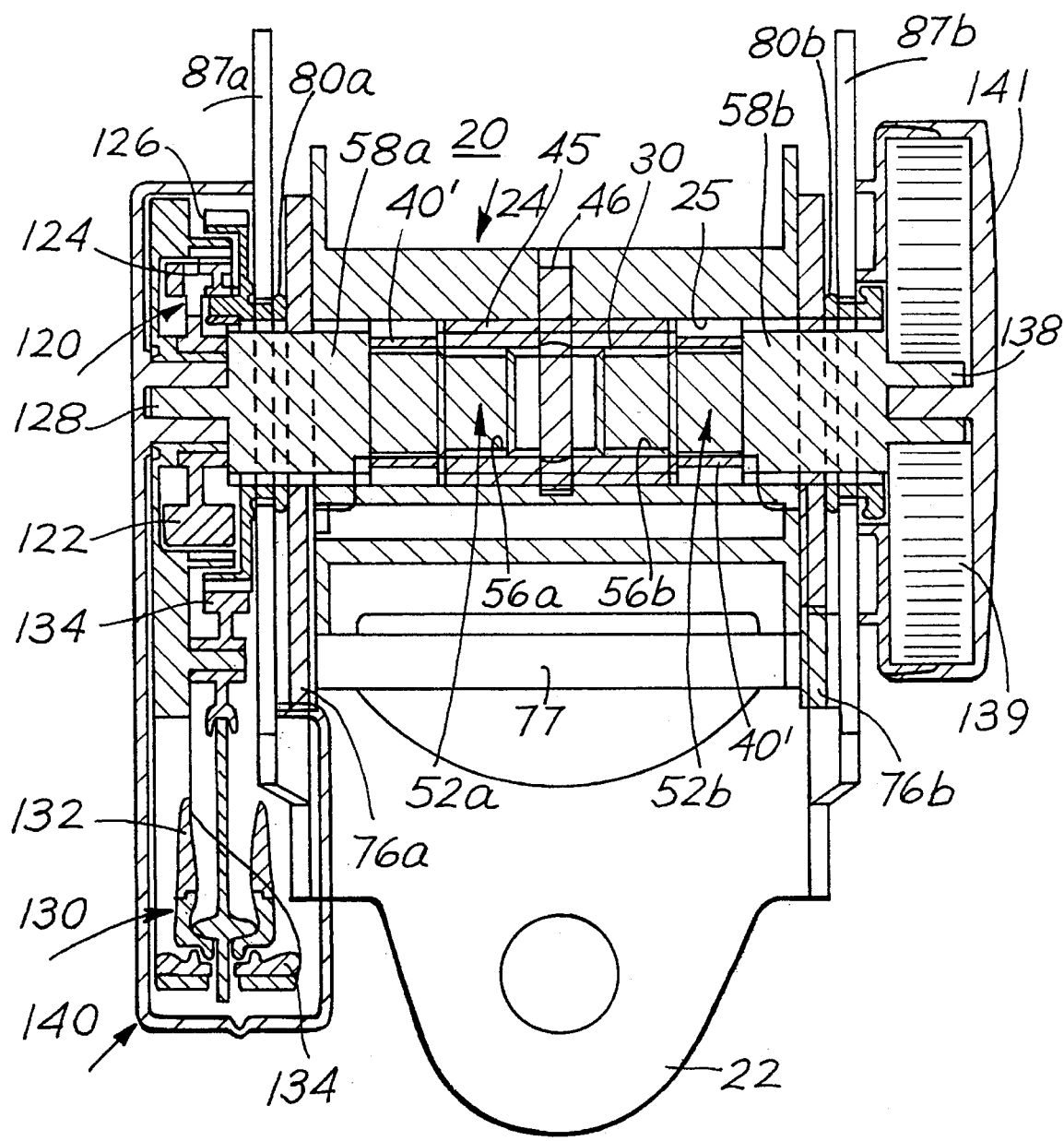
FIGS. 9 and to show an alternate embodiment of the invention.

Reference is now made to FIGS. 1–2 which shows a retractor 20 having a spool 24 rotationally mounted to the frame 22. In the preferred embodiment of the invention the spool 24 includes a center stepped bore 25 extending therethrough having a narrow threaded center portion 26 and wider diameter portions 28a and 28b on either side thereof. Either side of the center portion 26 proximate each wide portion 28a,b is provided with screw threads 30 which may be right or left hand threaded. Located on the reel 24 and situated radially outside of each threaded section of the bore 25 are annular cut-outs 32. The two opposite cut-outs 32 form, in cooperation with the material in the reel 24, a thin, axially extending ring 40 of predetermined length and strength, on either side of the narrow portion 26 of the bore 24. As will be seen from the discussion below this ring 40, depending on the material used, is deformable, crushable or collapsible when subjected to compressive loads. In the preferred embodiment of the invention the spool 24 may be made from cast or formed metal or from a structural plastic. Some metal castings and plastics do not possess a sufficient load bearing capability to permit incorporation of stress receiving screw threads. If the material used is incapable of absorbing stress, then an additional bushing such as 45 (see FIG. 9), fabricated of a structural material such as steel can be inserted in the reel, as a load bearing member, wherein the load bearing screw threads are formed on the bushing. As shown in FIG. 9 the bushing 45 is joined to the reel by a pin 46.

The reel further includes an axle 50 which extends through the bore 25. In the preferred embodiment of the invention a split axle is used comprising first and second axle parts 52a,b. Each axle part 52a,b includes a narrow first member 54a, received in the narrow diameter part 26 of the bore 25. The narrow first member 54a, of the axle part 52a,b may also include a threaded portion 56a,b engageable with the threads 30 on the reel 24 or on the bushing 45. Each axle part further includes a large diameter second member 58a,b and a transition surface such a shoulder 60a,b. During assembly each axle part 52a,b is threaded within the ends of the bore 25 until its respective shoulder 60a,b contacts a respective end of the axial ring 40. Details of the axle pares 58a,b are also be found in FIGS. 4 and 5. During normal operation, the axle parts 52a,b remain in this position, that is fixed on the reel 24. Each axle part 52a,b is maintained in this orientation due to the inherent friction or preload between the reel threads 30 and the threads 56 on each axle part. As can be appreciated the threads permit the axle parts 52 to be preloaded against interfacing reel parts, that is to provide a certain preload to withstand the normal inertial loads input to the reel without moving and against which energy absorbing will begin in an emergency situation. While the pitch of each the threads in the axle pares and the reel may be identical they may be slightly different permitting threading of the coacting parts but with increased force retention.

The large diameter axle part 58a,b includes splines 59 or sloes and received in the large diameter portion 28a,b of bore 25. The splines permit sliding attachment of each axle part to a respective translationally fixed, lock wheel 62a,b, one of which is positioned on either side of the reel 24.

As shown in FIG. 2, each lock wheel 62 is fixedly positioned on the outside wall of an integrally formed reel flange 64a,b as well as about the outside surface of the axle parts 58a,b. As can be seen from FIGS. 1 and 2 the reel 24 also includes a slot 66, eccentrically positioned relative to the center axis of the reel 24, into which an end of a length of seat belt webbing (not shown in these figures but shown later)is received and secured in a known fashion.

One of the lock wheels 62a is shown in isolation in FIG. 5 and also includes complimentary shaped grooves 70 and lands 72 forming splines 73 which interact with the splines 59 on each axle part 52a,b. The cooperating splines permit the axle part 52 to slide through splines 73 prohibiting relative rotation therebetween. Located at the periphery of the lock wheel 62a,b are a plurality of locking teeth 74. As will be briefly described below the rotation of the reel 24 is halted by engaging the teeth 74 on one or both lock wheels with a lock pawl 76 that is moved into engagement upon activation of a vehicle sensor responsive to changes in vehicle deceleration, or a web acceleration sensor responsive to changes in web pay out from the reel.

The split axle parts 52 extend beyond each lock wheel 62 and are rotationally supported directly or indirectly in the retractor frame 22. Such support can be accomplished by using a bushing 80a,b (see FIGS. 6 and 7) placed about each splined section of each axle part 58a,b. As can be seen bushing 80a includes a center splined portion 82a which cooperates with the splines on the axle parts 58a and an outer smooth bushing part 84a received within a hole or bearing provided in side 87a of the frame 22. The bushing 80b also includes a center splined section, and an outer smooth bushing part received within a hole or bearing in side 87b. At least one axle part such as 58a extends outward from the frame 22 to permit easy access to a retractor part that moves with the rotational speed of the reel. In this manner the axle part can be easily attached to a sensor such as a web sensor which can be configured to cause the locking of one or both lock wheels 62a,b. One such configuration is also shown in greater detail below.

The present invention is assembled by threading each axle part in the bore 25 so that each shoulder is bottomed out against a corresponding crushable ring 40, or by the two axle parts bottoming out against each other in the center of the spool or reel. The axle parts 52a,b are assembled to a corresponding lock wheel by interconnection of the splines 59 and 73. A lock pawl 76 is provided and maintained spaced from the lock wheels to permit the reel to rotate. The operation of the present invention follows: During non-emergency situations the retractor 20 operates to permit the continued protraction and extraction of webbing from the reel 24. During such normal operation the lock wheels which are connected to and rotate with the reel 24 by the interaction of the various sets of splines and threads. The axle parts 52 rotate with the reel primarily due to the frictional engagement between the reel and axle part threads as long as the crush strength of the deformable annular ring 40 is not be exceeded. During an emergency of sufficient magnitude either the vehicle or web sensor is activated. Subsequently, because of such activation, the lock pawl 76 is brought into contact with and causes one or both lock wheels 62 and the reel 24 to be locked. As can be appreciated this depends on whether or not double sided locking is or is not used. Once the reel is locked, the decelerative forces of the accident will cause the occupant to typically move forward to load the shoulder belt portion of the webbing extending from the retractor 20. This loading is translated directly from the webbing to the reel 24 and from the reel 24 to the lock teeth 62 through the threads and splines. At some level of applied loading, desirably between 350 and 2000 pounds, to the reel through the stress developed in the webbing, the reel 24 will begin to try to rotate relative to the now lock axle parts. It should be recalled that the axle parts are locked by virtue of the connection to the lock wheels which have been locked by one or more lock pawls. The level at which the reel begins to move is determined by the amount of energy needed to overcome the friction forces at the thread interface and the crush strength of the ring 40. As mentioned, this loading is in the range of 350–2000 pounds. At such level of loading the rings 40 will begin to deform or crush removing energy as the occupant continues to load the shoulder belt. As the ring crushes, and with the lock wheels still locked, the continued stress loading on the webbing will cause the reel to rotate relative to the fixedly held threaded axle parts 52a,b. This relative rotation will cause the axle parts to move inwardly (see arrows 59) along the threads causing the further crushing or deformation of the rings 40 removing or absorbing energy and limiting the energy directed to the occupant. As can be appreciated, as the reel rotates under the effect of occupant load, on the locked axle 50 a controllable amount of webbing is allowed to protract with lessened loading on the occupant.

Reference is made to FIG. 8 which shows a time curve 100 of the forces or energy absorbed by the present invention. As an example the first part of the curve 102 shows the restraint force, which typically loads the chest of the occupant during a crash, increasing at a fixed slope defined by the elongation of the webbing and elastic deformation in the restraint system. The second portion of the curve 104 is generally flatter and of a lower or zero slope than the first part of the curve. The reason for this is that during this time energy is dissipated or absorbed by the retractor 20 as the axle parts crush the rings 40. This energy is advantageously removed from the occupant and transferred to deformation energy in rings 40. The slope of this part of the curve is defined in part by amount of energy it takes to rotate the reel parts against the friction force of the threads as well as the energy required to crush the rings 40. As can be appreciated the curve 100 and more specifically the dynamic performance of the retractor can be tuned by varying the thickness and length of the ring 40 which will vary the threshold at which energy limiting occurs and the total amount of energy that may be absorbed by the retractor 20. As can be appreciated, a thicker ring will increase the load level at which energy is absorbed, while a longer axial ring will decrease the load level.

The force level needed to deform the rings can be raised or lowered by increasing or decreasing the frictional interface between the reel and axle threads.

The slope of the last part 106 of the curve 100 is again defined by the resiliency of the retractor parts including the resiliency of the webbing. In one embodiment of the invention the inward movement of the axle parts can be limited by permitting such parts to contact one another after a determinable amount of reel rotation. Consequently, the relative location of the third part 106 of the curve can be controlled by sizing the length of the axle parts 52a,b and controlling the amount of reel rotation (axle movement) needed to have these parts touch.

One benefit of the present invention is that it is after absorbing energy of the crash the retractor is still fully functional so as to permit the protraction and retraction of the webbing after the initial accident. As the retractor 20 is fully operational it will also be ready to again lock to protect the occupant in the event of a secondary impact to the vehicle of sufficient strength to cause activation of either of the vehicle or web sensor.

Reference is made to FIG. 9 which shows a more detailed embodiment of the invention. Similar parts are referred to by the same numeral. In this embodiment the reel 24 includes a constant diameter bore 25. Received in the bore 25 is a bushing 45 held in place by a pin 46. The bushing 45 includes the threads 30 previously formed in the reel 24. The crushable rings 40 are formed by annular bushings 40' received in the bore 25. Two axle parts 52a,b are threadably received in the threads 30. The axle parts include the threads 56a,b respectively. As before the larger diameter parts 58a,b of the axle parts are received in a bushing 80a,b received in the frame sides 87a,b. The left hand axle part 52a is received in a web sensor 120 having a sensing mass 122 and activation pawl 124 which engages teeth 126 attached to the bushing 80a in the frame side. In this embodiment the axle part 52a includes an extending pin or bushing 128 which is received in a cover 140. Also shown is a vehicle sensor 130 having a movable mass 132 supported in a seat 134 the movement of the mass 132 causes the movement of the vehicle sensor pawl which also engages the teeth 126. The engagement of either of the web sensor pawl or the vehicle sensor pawl with the teeth causes the rotating cover 140, which houses the various sensors, to move lifting the lock pawls 76 into engagement with the teeth 74 of the lock wheels 62a,b. As shown two lock pawls 76a,b are shown connected by a tie bar 77. Reference is made to the right hand side of the retractor 20. As can be seen the axle part 52b includes a split pin or bushing 138 which functions as a spring arbor to receive an end of the rewind spring 139. A cover 141 covers the spring 139.

FIG. 10 shows a side view of the retractor shown in FIG. 9 and also shows the webbing 142 captured in the slot 66. FIG. 10 shows one of the lock pawls in engagement with a lock wheel. The lock pawl is also shown rotationally supported within a notch 144 formed in a each frame side 87a,e.

Many changes and modifications in the above described embodiment of the invention can, of course, be carried out without departing from the scope thereof. Accordingly, that scope is intended to be limited only by the scope of the appended claims.

We claim:

1. A load absorbing retractor comprising:

a rotatable spool or reel, seat belt webbing wound about the spool;

first means, responsive to loads generated during an emergency situation, for deforming at least one deformable part and in so doing dissipating a determinable amount of the energy, wherein the first means comprising:

a first bore in the retractor, an axle, having an axial advanceable first axle part and second axle part received in the bore for rotationally supporting the spool, second means for advancing the first axle part in the bore and for causing a portion of the at least one deformable part to be crushed in response to the advancing motion of the first axle part to generate a determinable reaction force in the seat belt when loaded by an occupant and a stop means engageable after a determinable amount of advancement of the first axle part, for preventing further advancement of the first axle part to increase the reactive force, wherein the second axle part is opposingly received in the bore and axial advanceable relative to the first axle part and wherein the first means includes another deformable part, and the retractor includes third means for advancing the second axle part in the bore and for causing a portion of the other deformable part to be crushed in response to the advancing motion of the second axle part and wherein the stop means is engageable with the second axle part after a determinable amount of advancement of the second axle part, for preventing further advancement of the second axle part, wherein the stop means includes facing portions of the first and second axle parts which come together after the determinable amount of advancement of the first and second axle parts.

2. The device as defined in claim 1 wherein the first and second parts are axially slidable together.

3. A load absorbing retractor comprising:

a rotatable spool or reel having a bore therein, seat belt webbing wound about the spool;

first means, responsive to loads generated during an emergency situation, for deforming at least one deformable part and in so doing dissipating a determinable amount of the energy, wherein the first means comprising:

a first bore, an axially advanceable first and second axle part movable relative to one another, received in the bore, for rotationally supporting the spool;

second means for advancing the first and second axle parts in the bore and for causing a portion of the at least one deformable part to be crushed in response to the advancing motion of the first axle part to generate a determinable reaction force in the seat belt when loaded by an occupant;

stop means, including facing portions of the first and second axle parts for engageably coming together after a determinable amount of advancement of one of the first and second axle parts for preventing further advancement of the first and second axle parts.

4. The device as defined in claim 3 wherein the first means includes another deformable part, and the retractor includes third means for advancing the second axle part in the bore and for causing a portion of the other deformable part to be crushed in response to the advancing motion of the second axle part.

* * * * *